United States Patent
Rajwan et al.

(10) Patent No.: US 11,836,107 B2
(45) Date of Patent: Dec. 5, 2023

(54) POWER CONSUMPTION CONTROL BASED ON RANDOM BUS INVERSION

(71) Applicant: Apple Inc., Cupertino, CA (US)

(72) Inventors: Doron Rajwan, Rishon Lezion (IL); Lior Zimet, Kerem Maharal (IL); Sagi Lahav, Kiryat Bialik (IL)

(73) Assignee: APPLE INC., Cupertino, CA (US)

( * ) Notice: Subject to any disclaimer, the term of this patent is extended or adjusted under 35 U.S.C. 154(b) by 38 days.

(21) Appl. No.: 17/683,396

(22) Filed: Mar. 1, 2022

(65) Prior Publication Data
US 2023/0281154 A1  Sep. 7, 2023

(51) Int. Cl.
*G06F 15/78* (2006.01)
*G06F 13/40* (2006.01)

(52) U.S. Cl.
CPC ...... *G06F 15/7807* (2013.01); *G06F 13/4013* (2013.01)

(58) Field of Classification Search
CPC .................... G06F 13/4013; G06F 15/7807
See application file for complete search history.

(56) References Cited

U.S. PATENT DOCUMENTS

| | | |
|---|---|---|
| 7,522,073 B1 | 4/2009 | Kao |
| 7,701,368 B2 | 4/2010 | Hollis |
| 8,451,913 B2 | 5/2013 | Oh et al. |
| 8,498,344 B2 | 7/2013 | Wilson et al. |
| 8,510,490 B2 | 8/2013 | Abbasfar |
| 8,943,382 B2 | 1/2015 | Abbasfar |
| 9,142,269 B2 | 9/2015 | Hein |
| 9,252,802 B2 | 2/2016 | Hollis |
| 9,792,246 B2 | 10/2017 | Teoh et al. |
| 9,798,693 B2 | 10/2017 | Hollis |
| 9,922,686 B2 | 3/2018 | Hollis et al. |
| 10,031,868 B2 | 7/2018 | Mozak et al. |
| 10,303,629 B2 | 5/2019 | Shu |
| 10,373,657 B2 | 8/2019 | Kondo et al. |
| 10,445,288 B2 | 10/2019 | Chu |
| 10,747,695 B2 | 8/2020 | Ho et al. |
| 2012/0206280 A1 | 8/2012 | Abbasfar et al. |

(Continued)

FOREIGN PATENT DOCUMENTS

JP            3562644 B2       9/2004

OTHER PUBLICATIONS

International Application # PCT/US2022/053576 Search Report dated Mar. 27, 2023.

(Continued)

*Primary Examiner* — Gil H. Lee
(74) *Attorney, Agent, or Firm* — KLIGLER & ASSOCIATES PATENT ATTORNEYS LTD

(57) ABSTRACT

An electronic device includes circuitry and a plurality of ports. The plurality of ports includes an input port and an output port, configured to communicate data units with one or more other devices across a fabric of a System on a Chip (SoC), the data units include N data bits, N being an integer larger than 1. The circuitry is configured to receive an input data unit via the input port, to make a random decision of whether to invert the N data bits in the input data unit, to produce an output data unit by retaining or inverting the N data bits of the input data unit based on the random decision, and to send the output data unit via the output port.

18 Claims, 8 Drawing Sheets

(56) References Cited

U.S. PATENT DOCUMENTS

| | | |
|---|---|---|
| 2015/0139355 A1 | 5/2015 | Hollis |
| 2015/0178237 A1 | 6/2015 | Kesling et al. |
| 2016/0019179 A1 | 1/2016 | Loke et al. |
| 2016/0173134 A1 | 6/2016 | Kwon et al. |
| 2016/0285624 A1 | 9/2016 | Wagh et al. |
| 2018/0285304 A1 | 10/2018 | Kozhikkottu et al. |
| 2019/0332279 A1 | 10/2019 | Hollis et al. |
| 2020/0285599 A1* | 9/2020 | Dadual ............... G06F 13/4234 |
| 2021/0004347 A1 | 1/2021 | Lanka et al. |
| 2021/0182223 A1* | 6/2021 | Choi ....................... G11C 7/02 |
| 2023/0132306 A1* | 4/2023 | Yao ...................... G11C 29/022 |
| | | 711/105 |

OTHER PUBLICATIONS

U.S. Appl. No. 17/402,547 Office Action dated Feb. 28, 2023.
Kolor et al., U.S. Appl. No. 17/337,805, filed Mar. 6, 2021.
Ostrovsky et al., U.S. Appl. No. 17/402,547, filed Aug. 15, 2021.

* cited by examiner

POWER CONSUMPTION CONTROL BASED ON RANDOM BUS INVERSION

TECHNICAL FIELD

Embodiments described herein relate generally to System on a Chip (SoC) integrated circuits (ICs), and particularly to methods and systems for limiting power consumption in a SoC by randomly applying bus inversion operations.

BACKGROUND

Various computer systems such as a System on a Chip (SoC) comprise multiple agent devices communicating over a fabric. Power consumption in the SoC depends on various factors such as the SoC structure, supply voltage, and traffic traversing the fabric.

Power consumption in the SoC may be reduced, for example, by reducing the power consumed by individual links of the fabric. Methods for reducing power consumption over a bus are known in the art. For example, Data Bus Inversion (DBI) is a technique designed to reduce power consumption caused by bit toggles between successive transmissions over the bus. In conventional DBI, a data unit is logically inverted when at least half of the bits differ between the data unit and the previously transmitted data unit.

U.S. patent application Ser. No. 17/402,547 describes an electronic device that includes a bus driver and circuitry. The bus driver is coupled to a parallel bus including N data lines. The circuitry is configured to receive a data unit for transmission over the N data lines, to determine a first count indicative of a number of data bits in the data unit having a predefined value, and a second count indicative of a number of inverted data bits relative to corresponding bits in a previously transmitted data unit, to make a decision of whether to invert the data unit based on the first and second counts, depending on whether such inversion is expected to reduce power consumption of transmitting the data unit over the bus, to produce an output data unit by retaining or inverting the data unit based on the decision, and to transmit the output data unit over the data lines via the bus driver.

U.S. Patent Application Publication 2016/0173134 describes methods and apparatus relating to enhanced Data Bus Invert (EDBI) encoding for OR chained buses. In an embodiment, incoming data on a bus is encoded based at least in part on a determination of whether a next data value on the bus is going to transitioning from a valid value to a parked state.

SUMMARY

An embodiment that is describe herein provides an electronic device that includes circuitry and a plurality of ports. The plurality of ports includes an input port and an output port, configured to communicate data units with one or more other devices across a fabric of a System on a Chip (SoC), the data units include N data bits, N being an integer larger than 1. The circuitry is configured to receive an input data unit via the input port, to make a random decision of whether to invert the N data bits in the input data unit, to produce an output data unit by retaining or inverting the N data bits of the input data unit based on the random decision, and to send the output data unit via the output port.

In some embodiments, the circuitry is configured to receive the input data unit after the input data unit has been processed in a network device included in the fabric, and to transmit the output data unit via the output port to a link of the fabric. In other embodiments, the circuitry is configured to receive the input data unit from a link of the fabric via the input port, and to send the output data unit for processing in a network device included in the fabric, via the output port. In yet other embodiments, the circuitry is configured to make the random decision independently of values of the data bits in the received input data unit.

In an embodiment, the circuitry is configured to receive via the input port a subsequent input data unit, and to make another decision of whether to invert the subsequent input data unit, randomly or based on the input data unit. In another embodiment, the circuitry is configured to receive via the input port one or more other input data units that together with the input data unit jointly traverse the fabric, and to make respective decisions of whether to invert the other input data units depending on values of the output data unit and the other input data units.

In some embodiments, the circuitry is configured to make a first random decision of whether to invert a first subset of the N data bits of the input data unit, and to make a second random decision of whether to invert a second subset of the N data bits of the input data unit, so that making the second random decision is independent of making the first random decision. The circuitry is further configured to produce the output data unit by retaining or inverting the first subset of the N data bits based on the first random decision, and retaining or inverting the second subset of the N data bits based on the second random decision. In other embodiments, the circuitry is configured to produce respective first and second indications of whether the first subset of the N data bits and the second subset of the N data bits have been inverted, and to output the first and second indications via the output port or via another interface of the electronic device. In yet other embodiment, the electronic device resides in a first location in the fabric, and a second electronic device that makes random decisions of whether to invert data units resides in a second different location in the fabric, and the circuitry is configured to make the random decision independently of random decisions made by the second electronic device.

There is additionally provided, in accordance with an embodiment that is described herein, a method for bus inversion, including, in an electronic device that includes a plurality of ports, including an input port and an output port, communicating data units with one or more other devices across a fabric of a System on a Chip (SoC), the data units including N data bits, N being an integer larger than 1. An input data unit is received via the input port. A random decision of whether to invert the N data bits in the input data unit is made. An output data unit is produced by retaining or inverting the N data bits of the input data unit based on the random decision. The output data unit is sent via the output port.

There is additionally provided, in accordance with an embodiment that is described herein, an electronic system including a fabric, circuitry, a plurality of agent devices, and a plurality, of bus inversion devices. The fabric includes multiple network devices interconnected by links, each link including multiple lines for communicating data units including multiple data bits. The agent devices are coupled to communicate via the fabric. The bus inversion devices are incorporated at selected locations in the fabric, each bus inversion device includes circuitry and a plurality of ports. The plurality of ports includes an input port and an output port, configured to communicate the data units over the fabric. The circuitry is configured to receive an input data unit via the input port, to make a random decision of whether to invert at least some of the data bits in the input data unit, to produce an output data unit by retaining or inverting the at least some of the data bits of the input data unit based on the random decision, and to send the output data unit via the output port.

In some embodiments, the fabric includes multiple sub-fabrics for providing separate communication between respective subsets of the agent devices.

There is additionally provided, in accordance with an embodiment that is described herein, a method, including, for a System on a Chip (SoC) having multiple elements interconnected by a fabric including multiple inks, calculating a number of electronic devices required in the SoC for meeting a peak power requirement in communicating data units over the fabric, the electronic devices making respective random decisions of whether to invert data units passing through the electronic devices. At least the calculated number of electronic devices are assigned to selected links or network devices in the SoC.

In some embodiments, calculating the number includes calculating the number based on a specified target toggle rate across the fabric. In other embodiments, calculating the number includes calculating a minimal number that meets a failure probability of exceeding the target toggle rate. In yet other embodiments, calculating the minimal number includes calculating the failure probability based on a cumulative Binomial distribution function.

In an embodiment, the fabric has multiple available locations for performing bus inversion, and assigning the electronic devices includes assigning the electronic devices to at least some of the available locations. In another embodiment, assigning the electronic devices includes, in response to identifying that the number of required electronic devices is larger than the number of the available locations, assigning multiple bus inversion devices to multiple respective subsets of lines of at least some of links the available locations. In yet another embodiment, assigning the electronic devices includes assigning an electronic device to a location at an input to a network device in the fabric. In yet further another embodiment, assigning the electronic devices includes assigning an electronic device to a location at an output of a network device in the fabric.

These and other embodiments will be more fully understood from the following detailed description of the embodiments thereof, taken together with the drawings in which:

DETAILED DESCRIPTION OF EMBODIMENTS

Overview

Figure 1A:
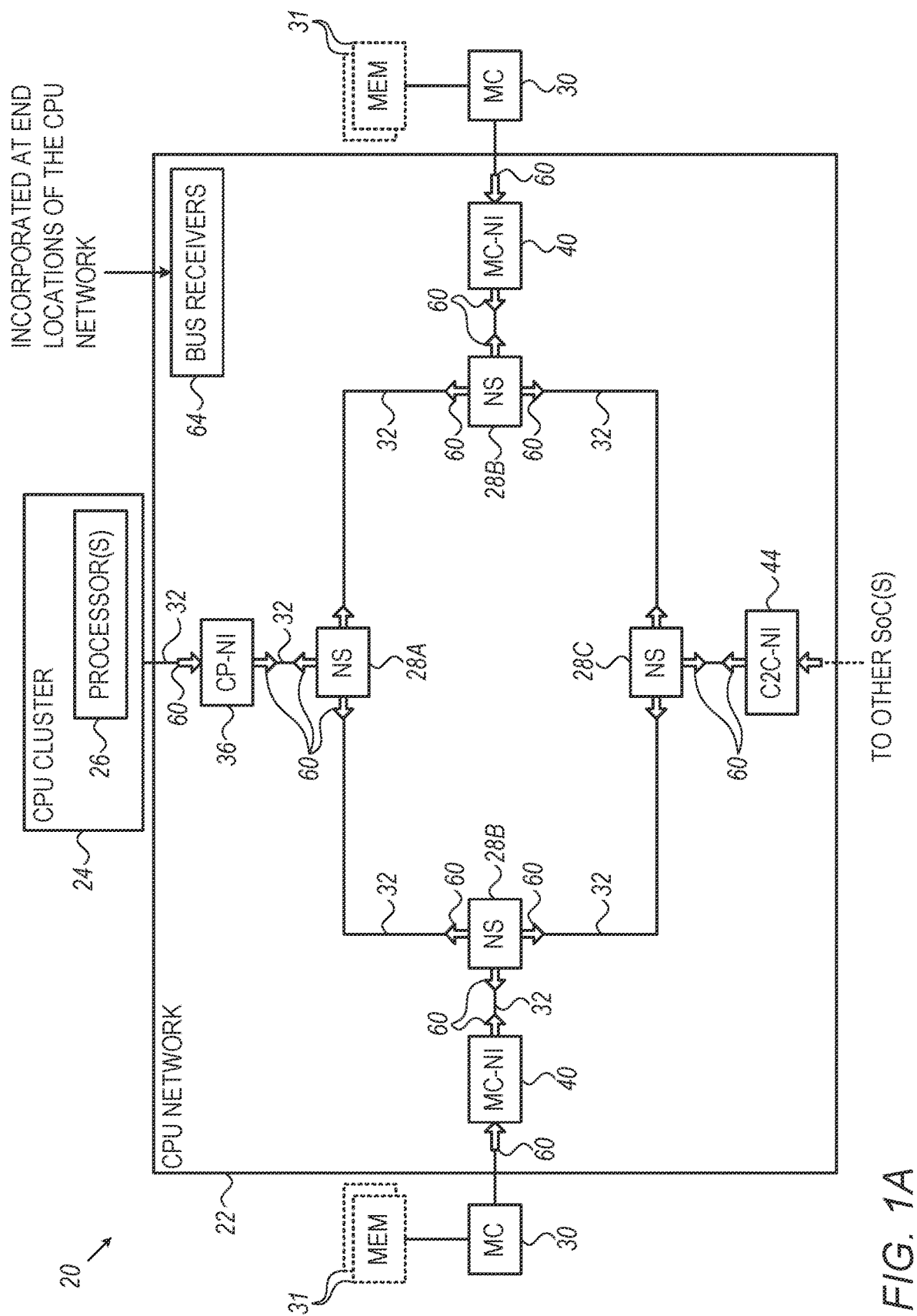
FIG. 1A is a block diagram that schematically illustrates a System on a Chip (SoC) comprising a CPU network supporting random bus inversion, in accordance with an embodiment that is described herein.

Embodiments that are described herein provide methods and systems for mitigating power consumption peaks in a System on a Chip (SoC), by randomly applying bus inversion operations across the SoC fabric.

A SoC typically comprises agent devices communicating over one or more internal fabrics. The agent devices may comprise, for example, Central Processing Units (CPUs), Graphics Processing Units (GPUs), Memory Controllers (MCs) coupled to memory devices, and Input/Output (IO) peripherals. A SoC fabric is also referred to herein as a "SoC network." Example SoC networks include a CPU network in which CPUs may communicate with MCs, an IO network in which peripheral devices may communicate with CPUs and MCs, and a relaxed order network in which CPUs may communicate with MCs.

During SoC operation, peaks in power consumption or electrical current may overwhelm, the power delivery system of the SoC, causing voltage droops below an acceptable level. Moreover, power consumption peaks may cause physical damage to the SoC, e.g., due to overheat.

In principle, power consumption in the SoC, may be reduced by performing conventional Data Bus Inversion (DBI) on individual links of the SoC network. A conventional DPI circuit, however, is costly in terms of chip area and power consumption, when duplicated over many links. Moreover, the DBI circuit typically introduces a latency of one or more transmission cycles, which may accumulate to a significant latency along a network path with multiple DBI circuits.

In the disclosed embodiments, power consumption peaks are mitigated by randomly applying bus inversion in selected locations of the SoC network. In the description that follows, an electronic device that makes a random decision of whether to invert a data unit is referred to as a Random Bus Inversion (RBI) device. A single RBI device requires little chip area and introduces no significant latency. By incorporating a sufficiently large number of RBI devices across the SoC network(S), peak power consumption events are essentially eliminated.

The SoC network typically comprises Network Switches (NSs) interconnected by links in a suitable topology. The links comprise multiple lines for sending multi-bit data units. An agent device may be coupled to a NS directly, or via a suitable Network Interface (NI).

When data units traverse a link or a network device, a "bit toggle" occurs when corresponding bits in two successive data units have opposite bit values. The average number of bit toggles across the SoC network, within a specified time window, relative to the maximal number of bits transmitted across the SoC network in this time window is referred to herein as a "toggle rate". The product of the toggle rate by the fabric utilization factor is typically highly correlated to the amount of power consumed in the SoC. In general, high toggle rates typically result in high power consumption, and vice versa. Consequently, power consumption peaks can be mitigated by controlling the toggle rate in the SoC.

Certain traffic patterns traversing the fabric may cause high toggle rates. For example, a power virus program may enforce a toggle rate of 100%. As will be described below, using the disclosed random bus inversion techniques, the probability of exceeding a desired target toggle rate is reduced so that power consumption peaks are essentially eliminated.

Consider an embodiment of an electronic device, comprising circuitry and a plurality of ports including an input port and an output port. The ports communicate data units with one or more other devices across a fabric of a System on a Chip (SoC). The data units comprising N data bits, N being an integer larger than 1. The circuitry is configured to receive an input data unit via the input port, and to make a random decision of whether to invert the N data bits in the input data unit. The circuitry is further configured to produce an output data unit, by retaining or inverting the N data bits of the input data unit based on the random decision, and to send the output data unit via the output port.

In some embodiments, the device resides at the output of a network device (e.g., a network switch or a network interface) in the fabric, in which case the circuitry receives the input data unit after the input data unit has been processed in a network device comprised in the fabric, and transmits the output data unit via the output port to a link of the fabric. In other embodiments, the device resides at the input of a network device in the fabric, and the circuitry receives the input data unit from a link of the fabric via the input port, and sends the output data unit for processing in a network device comprised in the fabric, via the output port.

In an embodiment, the circuitry makes the random decision independently of values of the data bits in the received input data unit (and of values of other data units received or transmitted by the network device). In another embodiment, the circuitry receives via the input port a subsequent input data unit, and makes another decision of whether to invert the subsequent input data unit, randomly or based on the input data unit. In yet another embodiment, the circuitry receives via the input port one or more other input data units that together with the input data unit jointly traverse the fabric, and makes respective decisions of whether to invert the other input data units depending on values of the output data unit and the other input data units.

In some embodiments, the circuitry makes a first random decision of whether to invert a first subset of the N data bits of the input data unit, and makes a second random decision of whether to invert a second subset of the N data bits of the input data unit, wherein making the second random decision is independent of making the first random decision. The circuitry produces the output data unit by retaining or inverting the first subset of the N data bits based on the first random decision, and retaining or inverting the second subset of the N data bits based on the second random decision. The circuitry further produces respective first and second indications of whether the first subset of the N data bits and the second subset of the N data bits have been inverted, and outputs the first and second indications via the output port or via another interface of the electronic device.

In some embodiments, multiple electronic devices making random decisions of whether to invert data units reside in various locations in the fabric. In such embodiments, each electronic device makes local random inversion decisions independently of random inversion decisions made by other electronic devices. The locations are selected so that the toggle rate (using RBI devices) is expected to be forced toward 50%. It is noted that the main goal is to reduce power consumption and prevent power consumption peaks at challenging conditions such as under an attack of a power virus causing a 100% toggle rate. When the toggle rate (without bus inversion) is below 50%, using RBI devices may even increase the power consumption but not to dangerous levels.

As noted above, random bus inversion may be used for mitigating power consumption peaks. Consider an embodiment of an electronic system (e.g., a SoC) that includes a fabric, a plurality of agent devices, and a plurality of bus inversion devices. The fabric comprises multiple network devices interconnected by links, each link comprising multiple lines for communicating data units comprising multiple data bits. The agent devices are coupled to communicate via the fabric. The bus inversion devices are incorporated at selected locations in the fabric, wherein each bus inversion device comprises circuitry and a plurality of ports, including an input port and an output port, for communicating the data units over the fabric. The circuitry is configured to receive an input data unit via the input port, to make a random decision of whether to invert at least some of the data bits in the input data unit, to produce an output data unit by retaining or inverting the at least some of the data bits of the input data unit based on the random decision, and to send the output data unit via the output port.

In some embodiments, the fabric comprises multiple sub fabrics for providing separate communication between respective subsets of the agent devices.

Further is described below, a method for determining the number and locations of RBI devices in a SoC, the method comprising, for a System on a Chip (SoC) having multiple elements interconnected by a fabric comprising multiple links, calculating a number of electronic devices required in the SoC for meeting a peak power requirement in communicating data units over the fabric, the electronic devices making respective random decisions of whether to invert data units passing through the electronic devices. At least the calculated number of electronic devices are assigned to selected links or network devices in the SoC.

In some embodiments, calculating the number comprises calculating the number based on a specified target toggle rate across the fabric, e.g., by calculating a minimal number that meets a failure probability of exceeding the target toggle rate. In some embodiments, calculating the minimal number comprises calculating the failure probability based on a cumulative Binomial distribution function.

Assigning the electronic devices may be carried out in various ways. For example, the SoC network has multiple available locations for performing bus inversion, and the electronic devices are assigned to at least some of the available locations. In general, an electronic device may be assigned to a location at an input to a network device in the fabric, or to a location at an output of a network device in the fabric.

In an embodiment, in response to identifying that the number of required electronic devices is larger than the number of the available locations, multiple bus inversion devices are assigned to multiple respective subsets of lines of at least some of links in the available locations.

In the disclosed techniques, electronic devices that randomly apply bus inversion operations are incorporated in a fabric of a SoC. The electronic devices consume little chip area and have no significant effect on communication latency. Using the disclosed embodiments, the probability of exceeding a specified target toggle rate, corresponding to a power consumption peak event, can be reduced to an acceptable level.

System Description

FIG. 1A is a block diagram that schematically illustrates a System on a Chip (SoC) 20 comprising a CPU network 22 supporting random bus inversion, in accordance with an embodiment that is described herein.

In SoC 20, agent devices communicating over the CPU network include a CPU cluster 24 comprising one or more processors 26, and Memory Controllers (MCs) 30, each of which is coupled to one or more external memory devices 31 (depicted in dotted line). Point to point connections in SoC 20 are made using links 32.

In the present example, CPU network 22 comprises Network Switches (NSs) 28A, 28B and 28C interconnected in a ring topology. Alternatively, other suitable topologies can also be used. The NSs are further coupled to agent devices in the SoC via suitable network interfaces, as described herein.

CPU cluster 24 is coupled to the CPU network via a Network interface (NI) 36 denoted CP-NI and NS 28A. Each of MCs 30 is coupled to the CPU network via a NI 40 denoted MC-NI and NS 28B. In some embodiments, processors 26 may store data in and read data from memory devices 31, by communicating suitable transactions over CPU network 22.

In some embodiments, SoC 20 supports communication with one or more other SoCs. In the present example, a NI 44 denoted C2C-NI is coupled to the CPU network via NS 28C. The C2C-NI extends the CPU network over one or more other SoCs.

CPU network 22 comprises multiple Random Bus Inversion (RBI) devises 60. The RBI devices are depicted as an arrow indicating the direction of traffic output by the RBI device. The purpose of incorporating RBI devices 60 in a SoC network such as a CPU network and/or an IO network is to increase randomization of traffic traversing the SoC network, so as to shift the toggle rate in the SoC toward 50%.

CPU network 22 further comprises multiple bus receiver devices 64, which are incorporated at edge locations of the CPU network (not shown). A bud receiver device terminates network paths that include one or more RBI devices 60.

In general, RBI devices may be incorporated in locations in which power consumption increases with the number bit toggles between successive data units. Such locations include outputs of network devices such as NSs and NIs, and inputs of network devices such as NIs.

In some embodiments, at least some of the NSs in the fabric support a fast path for transactions (data units) that need to pass through the NS within a single cycle. In such embodiments, transactions whose latency may exceed a single cycle period are subjected to RBI processing, whereas single-cycle transactions are not processed by the RBI.

The RBI devices may be incorporated at a selected location in various ways. For a network device output, the RBI device may be incorporated within the network device before the output port, as part of the output port circuit, or between the output port and the link. For network device input, the RBI device may be incorporated between the link and the input port, as part of the input port circuit, or within the network device after the input port.

In some embodiments, RBI device 60 may operate in a random mode or in a mixed mode. In the random mode, RBI device 60 makes a random decision of whether to invert a data unit. In the present context and in the claims, the term "random inversion decision" or "random decision" means that on average, decisions to invert a data unit are made with a probability that approximates 50%. The actual probability distribution and the probability of any given decision may differ from 50%, e.g., depending on the technique used to generate the decision. Furthermore, the term "random decision" also refers to a bus inversion decision that is made "pseudo-randomly" so that a sequence of pseudo-random decisions appears to be "random" even though it is typically generated by a deterministic and repeatable process. A mechanism for making pseudo-random decisions using a Pseudo-Random Number Generator (PRNG) will be described with reference to FIGS. 2A and 2B below.

In the mixed mode, RBI device 60 makes random inversion decisions for selected data units, and data-driven decisions (e.g., as done by a conventional DBI) for other data units. The structure of RBI devices operating in the random mode and in the mixed mode will be respectively described in detail with reference to FIGS. 2A and 2B.

Figure 1B:
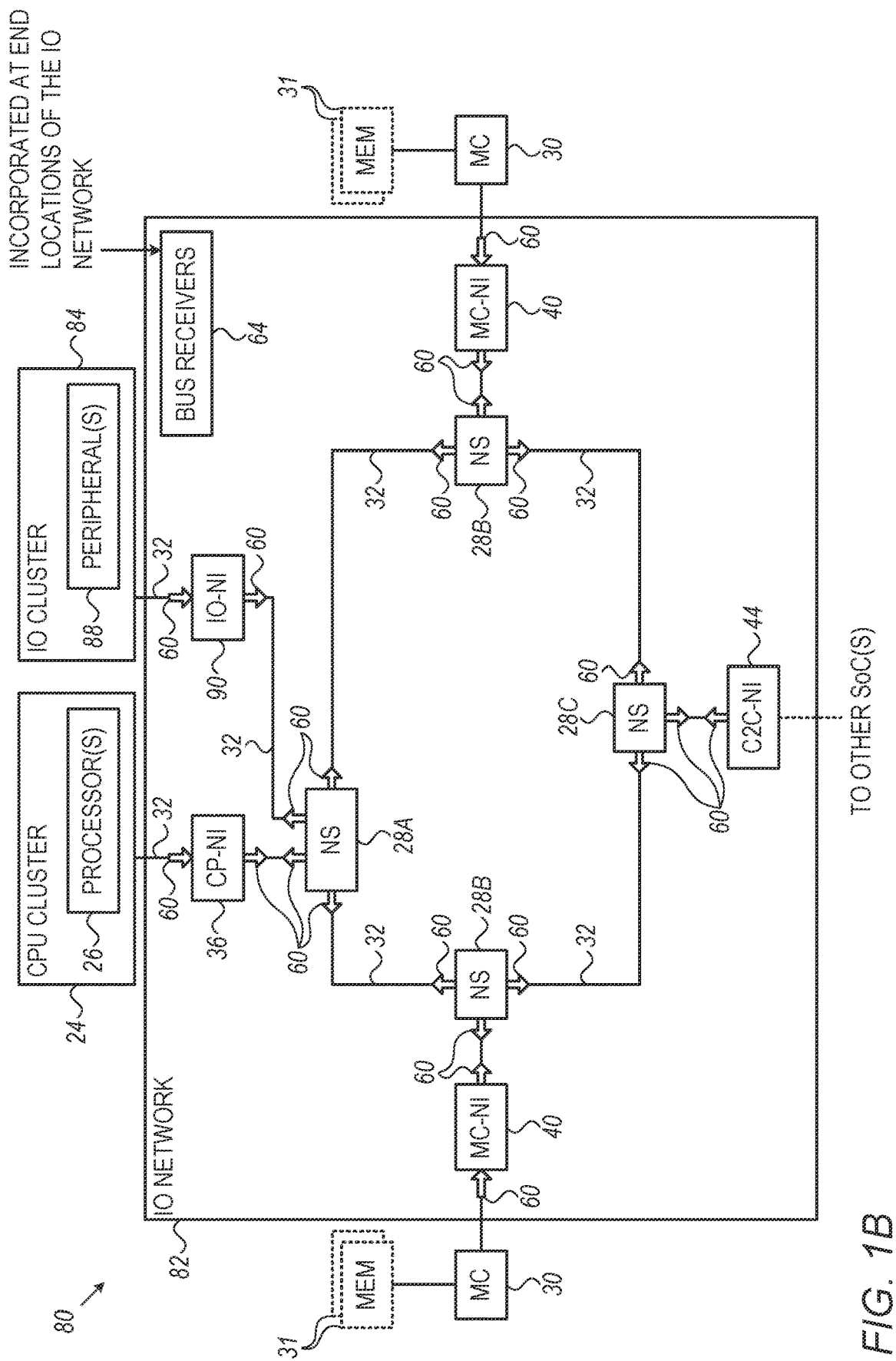
FIG. 1B is a block diagram that schematically illustrates a SoC comprising an IO network supporting random bus inversion, in accordance with another embodiment that is described herein.

FIG. 1B is a block diagram that schematically illustrates SoC 80 comprising an IO network 82 supporting random bus inversion, in accordance with another embodiment that is described herein.

In SoC 80, agent devices communicating over IO network 82 include a CPU cluster 24 comprising one or more processors 26, MCs 30 that each is coupled to one or more external memory devices 31 (depicted in dotted line), and an IO cluster 84 comprising one or more peripheral devices 88. Point to point connections in SoC 80 are made using links 32. IO network 82 supports communication between peripheral devices 88 and MCs 30, in addition to communication between processors 26 and MCs 30 also provided by the CPU network.

In SoC 80, IO cluster 84 is coupled to IO network 82 via an IO interface 90 denoted IO-NI, and NS 28A. In some embodiments, peripheral devices 88 may store data in and read data from memory devices 31, by communicating suitable transactions over IO network 82.

IO network 82 comprises RBI devices 60 incorporated in various locations in the IO network such as outputs and inputs to network devices, as described above. IO network 82 further comprises multiple bus receiver devices 64, which are incorporated at edge locations of the IO network (not shown), for terminating network paths that include one or more RBI devices 60.

In some embodiments, a SoC (e.g., such as SoCs 20 and 80) supports activation and deactivation of RBI devices. For example, the RBI devices may be activated at heavy loads and deactivated when no excessive power consumption and/or overheat are expected (e.g., even at a 100% toggle rate). For example, the RBI devices may be deactivated, when the utilization factor is below 50%, in which case using random bus inversion may increase the average power consumption.

The SoC and SoC network configurations shown in FIGS. 1A and 1B are given by way of example, and other suitable SoC and SoC network configurations can also be used. For example, in alternative embodiments, agent devices such as CPU clusters, MCs, and IO clusters may be instantiated as multiple discrete instances having their own respective NIs. Similarly, in alternative embodiments, may replicated as necessary. Moreover, CPU clusters and/or IO clusters such as those shown in FIGS. 1A and 1B may be increased or subdivided as required.

Structures of RBI and Receiver Devices

Figure 2A:
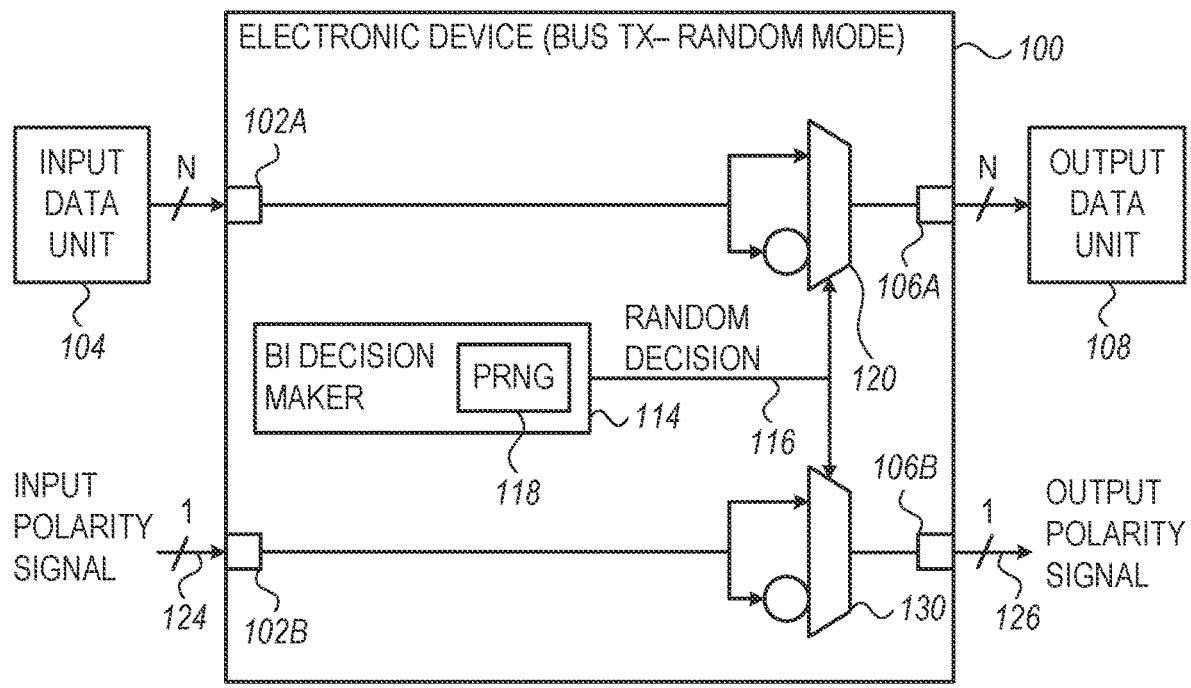
FIG. 2A is a block diagram that schematically illustrates an electronic device that makes random bus inversion decisions, in accordance with an embodiment that is described herein.

FIG. 2A is a block diagram that schematically illustrates an electronic device 100 that makes random bus inversion decisions, in accordance with an embodiment that is described herein.

Electronic device 100 serves as a RBI device operating in the random mode, and may be used in implementing RBI devices 60 in SoCs 20 and 80 of FIGS. 1A and 1B above.

RBI device 100 comprises an input port 102A for receiving input data units 104, and an output port 106 for outputting output data units 108. The input data units and the output data units comprise N-bit data units, N being a positive integer.

RBI device 100 comprises a Bus Inversion (BI) decision maker 114, configured to make a random decision 116 of whether to invert input data unit 104, or not. Decision maker 114 makes random decision 116 for a given data unit independently of the values of the given data unit and other data units received or output by the RBI device. In RBI device 100, a multiplexer 120 produces output data unit 108 by selecting input data unit 104 or an inverted version of the input data unit, based on random decision 116.

In some embodiments, decision maker 114 makes the random decision pseudo-randomly using a Pseudo-Random Number Generator (PRNG) 118. The PRNG produces a cyclic and deterministic sequence of numbers that appear random. In some embodiments, decision maker 114 makes random inversion decisions (116) by comparing respective numbers generated by the PRNG to a predefined threshold number. In an embodiment, the numbers produced by the PRNG are distributed uniformly in a predefined number-range. By setting the threshold number to a middle range value, decision maker 114 produces a decision to invert an input data unit with probability of 50% (or approximately 50%).

In some embodiments, RBI device 100 receives (e.g., along with input data unit 104) an input polarity signal 124, via an input interface 102B. RBI 100 produces a corresponding output polarity signal 126, and transmits it via an output interface 106B, along with output data unit 108. The output polarity signal serves as an input polarity signal for the next RBI in the network path, or as a final polarity signal for a bus receiver (e.g., bus receiver 64). RBI device 100 comprises a multiplexer 130 that selects between the input polarity signal and the inverted input polarity signal based on random decision 116.

Figure 2B:
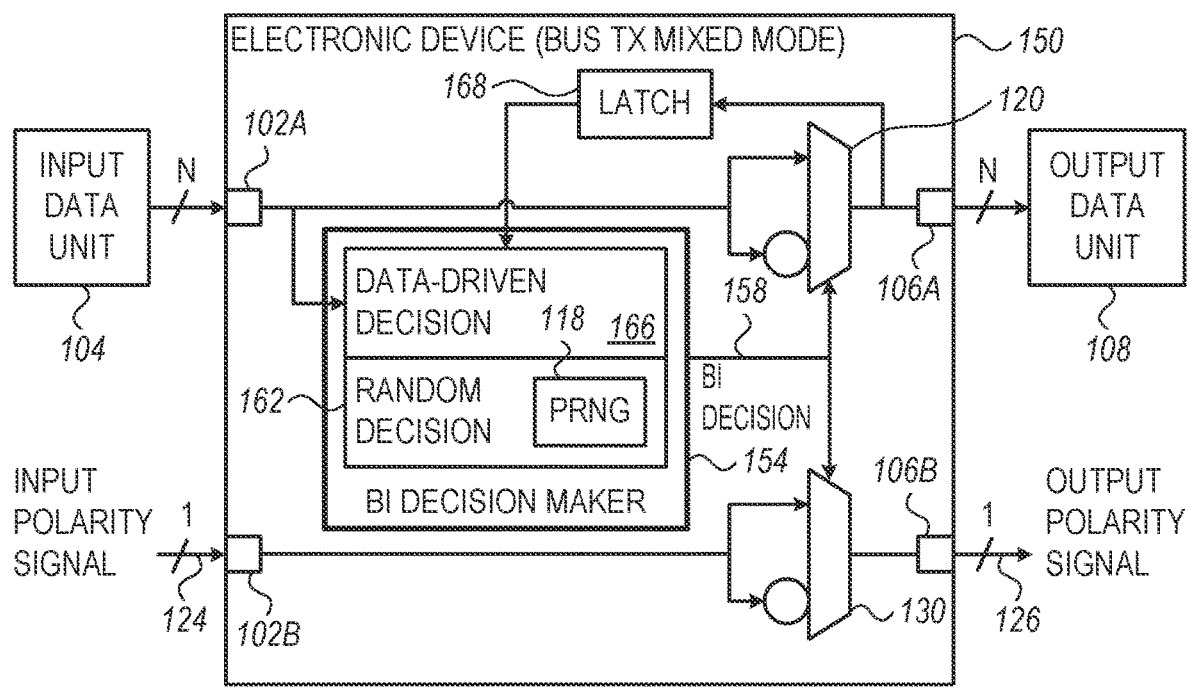
FIG. 2B is a block diagram that schematically illustrates an electronic device that makes random and data-driven bus inversion decisions, in accordance with an embodiment that is described herein.

FIG. 2B is a block diagram that schematically illustrates an electronic device 150 that makes random and data-driven bus inversion decisions, in accordance with an embodiment that is described herein.

Electronic device 150 serves as a RBI device operating in the mixed mode, and may be used in implementing RBI devices 60 in SoCs 20 and 80 of FIGS. 1A and 1B above.

Like RBI device 100, RBI device 150 receives data units 104 via input port 102A, produces respective output data units 108, and transmits the output data units via output port 106A. For each input data unit, a BI decision maker 154 produces a BI decision 158 that controls multiplexer 120 to select, for the output data unit, the input data unit or an inverted version of the input data unit RBI device 150 receives an input polarity signal 124 an interface 102B and using multiplexer 130 produces an output polarity signal 126 based on BI decision 158.

For each input data unit 104, the BI decision maker produces a BI decision using a random decision maker 162 or a data-driven decision maker 166. Random decision maker 162 is essentially similar to random decision maker 114 of FIG. 2A above, and may make random inversion decisions, for example, using PRNG 118, as described above. Data-driven decision maker 166 makes BI decisions based on values in one or more data units. In the present example, RBI device 150 comprises a latch 168 that latches the value of output data unit 108. The data-driven decision maker makes the data-driven decision based cm the present input data unit and the previously transmitted output data unit.

In some embodiments, RBI device 150 is incorporated in a SoC network supporting communication of packets, wherein each packet comprising multiple data units that jointly traverse the fabric. For multiple input data units received via the input port and belonging to the same packet, BI decision maker 154 makes random decision (using random decision maker 162) for the first input data unit in the packet, and makes data-driven decisions (using data-driven decision maker 166) for one or more other data units of the packet.

Figure 3:
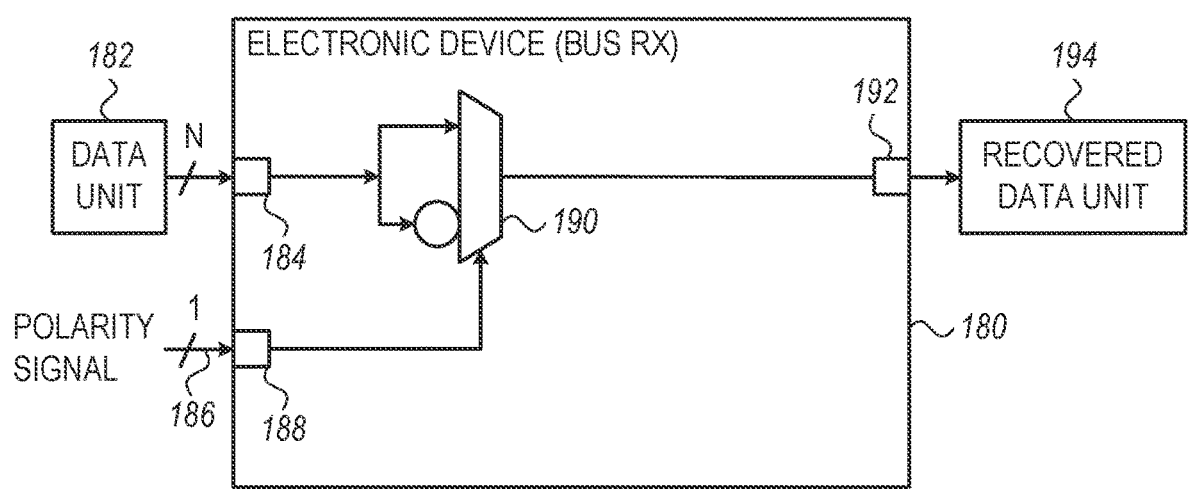
FIG. 3 is a block diagram that schematically illustrates an electronic serving as a bus receiver, in accordance with an embodiment that is described herein.

FIG. 3 is a block diagram that schematically illustrates an electronic device 180 serving as a bus receiver, in accordance with an embodiment that is described herein.

Bus receiver 180 may be used in SoCs 20 and 80 of FIGS. 1A and 1B, for terminating communication via network paths that include one or more RBI devices 60. The processing in bus receiver 180 is independent, however, from the actual bus inversion method used, and the bus receiver may be applicable in fabrics employing any suitable bus inversion techniques such as a conventional DBI or a combination of DBI and RBI, for example.

Bus receiver 180 receives a data unit 182 via an input port 184 and a polarity signal 186 via an input interface 188. Alternatively, both data units and the polarity signal may be received via the input port.

Data unit 182 and polarity signal 186 were produced by a RBI device (e.g., RBI device 100 or 150), which is the last RBI device along a network path from a source agent device to a destination agent device. Bus receiver 180 comprises a multiplexer 190, which based on the polarity signal, selects between data unit 182 and an inverted version of data unit 182, for producing a recovered data unit 194. The recovered data unit equals the data unit sent by the source agent.

Although in the example embodiments of FIGS. 2A, 2B and 3, polarity signals are received and transmitted via dedicated interfaces, in alternative embodiments, the polarity signals are communicated via the input and output ports serving for communication of data units.

Methods for Bus Inversion

Figure 4:
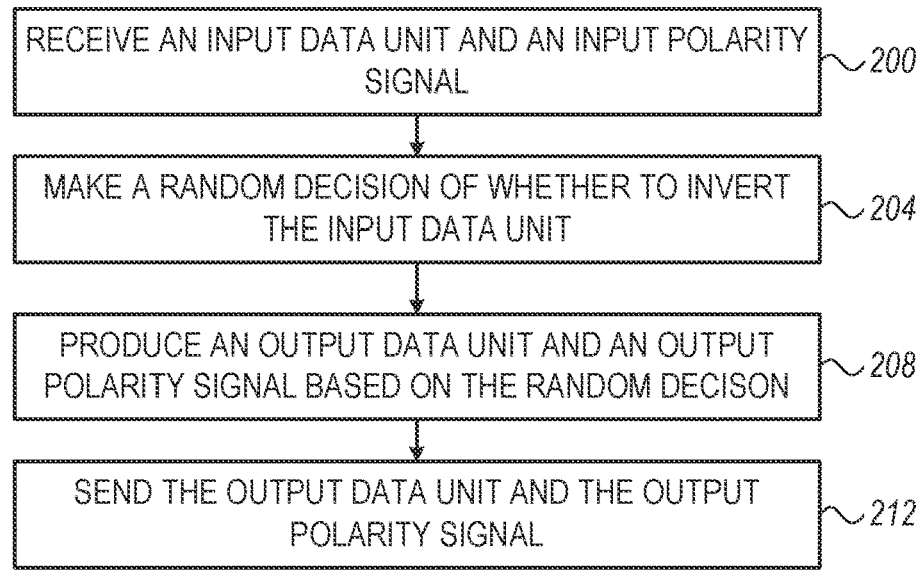
FIG. 4 is a flow chart that schematically illustrates a method for random bus inversion, in accordance with an embodiment that is described herein.

FIG. 4 is a flow chart that schematically illustrates a method for random bus inversion, in accordance with an embodiment that is described herein.

The method will be described as executed by a RBI device operating in the random mode, e.g., RBI device 100 of FIG.

2A above. The RBI device resides in a fabric of a SoC such as, for example, SoC 20 or SoC 80 of FIGS. 1A and 1B.

The method begins at a reception stage 200, with the RBI device receiving an input data unit and an input polarity signal. At a decision-making stage 204, the RBI device makes a random decision of whether to invert the received data unit.

At a decision application stage 208, the RBI device produces an output data unit and an output polarity signal based on the random decision of stage 204. Depending on the random decision, the output data unit equals the received data unit or an inverted version of the received data unit, and the output polarity signal equals the input polarity signal or the input polarity signal inverted. At an output stage 212, the RBI device sends (e.g., to a link of the fabric or to a network device of the fabric) the output data unit along with the output polarity signal. Following stage 212 the method terminates.

Figure 5:
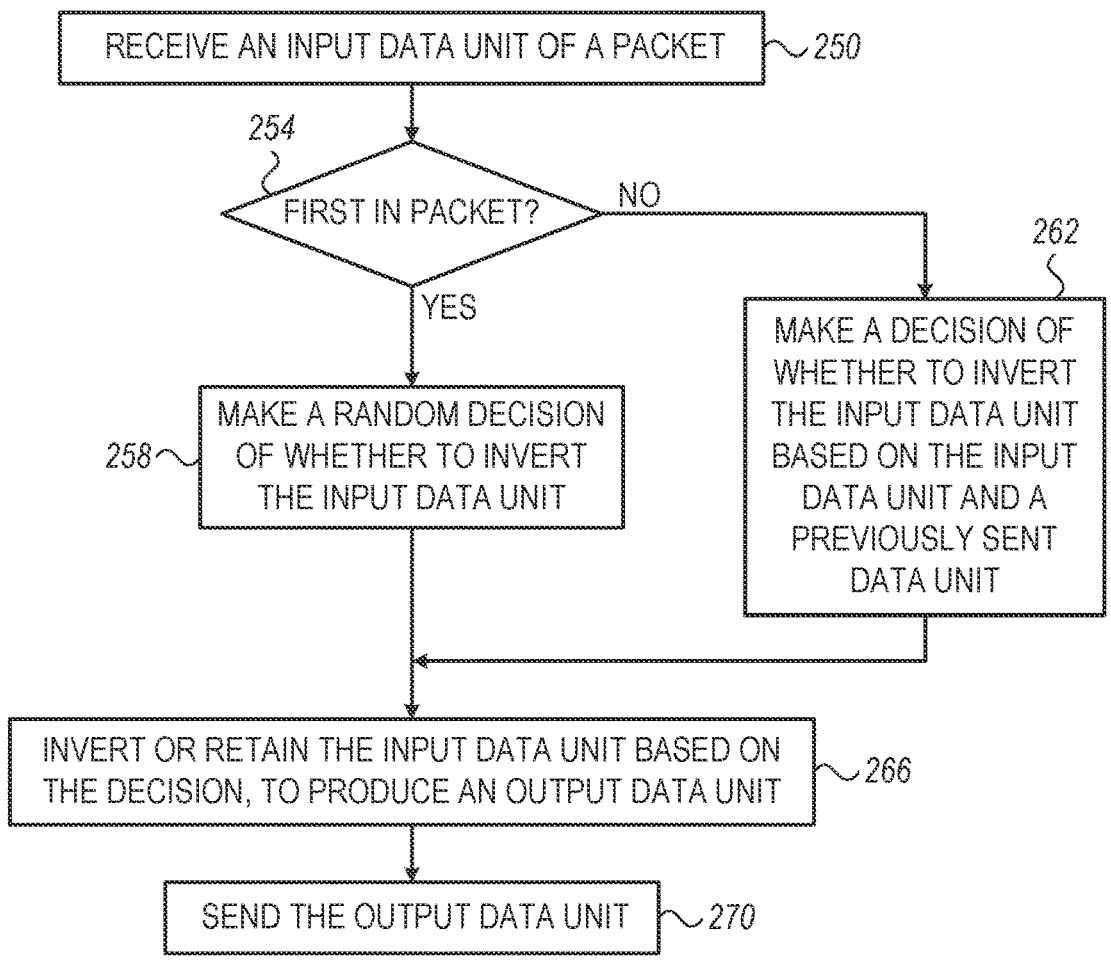
FIG. 5 is a flow chart that schematically illustrates a method for bus inversion applied to packets, in accordance with an embodiment that is described herein.

FIG. 5 is a flow chart that schematically illustrates a method for bus inversion applied to packets, in accordance with an embodiment that is described herein;

The method will be described as executed by a RBI device operating in the mixed mode, e.g., RBI device 150 of FIG. 2B above. The RBI device resides in a fabric of a SoC such as, for example, SoC 20 or SoC 80 of FIGS. 1A and 1B.

The method begins at a reception stage 250, with the RBI device receiving an input data unit belonging to a packet comprising two or more data units. At a query stage 254, the RBI device checks whether the received data unit is the first data unit in a packet, and if so, proceeds to a random decision-making stage 258. Otherwise, the RBI device proceeds to a data-driven decision-making stage 262.

At stage 258, the RBI device makes a random decision of whether to invert the input data unit for producing a corresponding output data unit. At stage 262, the RBI device makes a non-random data-driven decision of whether to invert the input data unit for producing a corresponding output data unit, based on values of one or more data units of the packet, e.g., the present input data unit and a previously transmitted data unit.

At a decision application stage 266, the RBI device produces an output data unit based on the inversion decision of stage 258 or 262. At an output stage 270, the RBI device sends the output data unit (e.g., to a link of the fabric or to a network device of the fabric). Following stage 266 the method terminates.

A Design Method for Determining the Number of RBI Devices Required in the SoC

Figure 6:
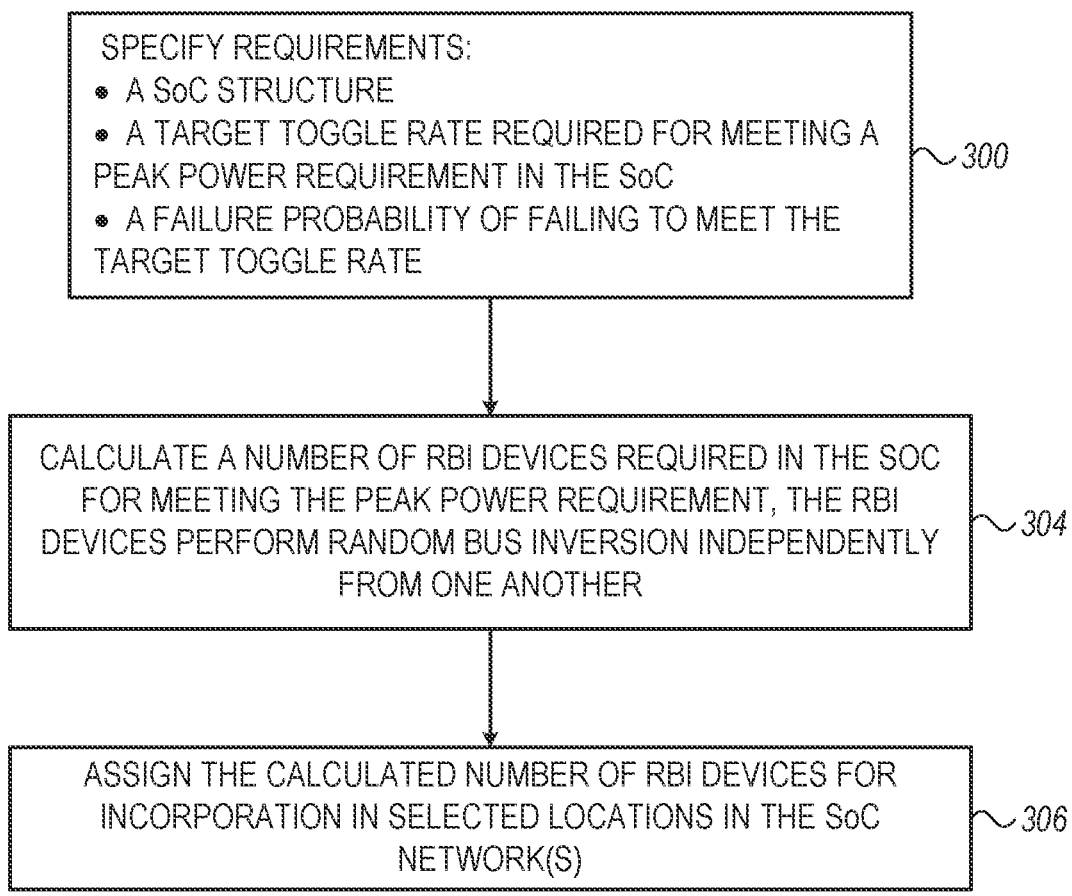
FIG. 6 is a flow chart that schematically illustrates a method for determining the number of Random Bus Inversion (RBI) devices required in the SoC for meeting a specified power consumption requirement, in accordance with an embodiment that is described herein.

FIG. 6 is a flow chart that schematically illustrates a method for determining the number of Random Bus Inversion (RBI) devices required in the SoC for meeting a specified power consumption requirement, in accordance with an embodiment that is described herein.

The method is described as executed by a processor as an offline process.

The method begins with the processor receiving design requirements, at a specification reception stage 300. In the present example, the processor receives at stage 300 (i) a SoC structure specifying the various elements and interconnections in the underlying SoC, (ii) a target toggle rate required for meeting a peak power requirement in the SoC, and (iii) a failure probability of failing to meet the target toggle rate.

The peak power requirement specifies the maximal power consumption allowed within a predefined time window. The target toggle rate specifies an upper limit on the ratio between the number of bit toggles in the time window and the maximal number of bits transmitted across the SoC network(s) within the time window. In order to meet the power consumption requirement, the toggle rate in the SoC needs to be retained below the target toggle rate.

The probability of failure to meet the target toggle rate, denoted "PF", is given by the expression:

$$PF = Pr(\text{Toggle rate} > \text{Target toggle rate}) \quad \text{Equation 1:}$$

At a number of RBI devices determination stage 304, the processor calculates the (minimal) number of RBI devices required in the SoC for meeting the peak power requirement. To this end, the processor calculates the number of RBI devices (making respective random inversion decisions) required for meeting the target toggle rate within the specified failure probability.

At an RBI assignment stage 306, the processor assigns the number of RBI devices determined at stage 304 for incorporation in selected locations in the SoC network(s). Following stage 306 the method terminates.

In some embodiments; at stage 304, the processor determines the number of RBI devices based on the Binomial distribution function given by:

$$f(n, k, p) = Pr(X = k) = \binom{n}{k} p^k (1-p)^{n-k}, k = 0, 1, 2 \ldots n \quad \text{Equation 2}$$

wherein $$\binom{n}{k} = \frac{n!}{k!(n-k)!}$$

The Binomial distribution function depends on parameters (n,k,p), wherein 'n' denotes the number of independent trials, each trial may succeed or fail, 'k' denotes the number of successful trials among the n trials, and 'p' denotes the probability of success in a single trial. The Binomial distribution function in Equation 2 calculates the probability of having successful trials out of the n trials.

The cumulative Binomial distribution function calculates the probability of having up to and including k successful trials out of the n trials, as given by:

$$F(n, k, p) = Pr(X \leq k) = \sum_{i=0}^{k} \binom{n}{i} p^i (1-p)^{i-k} \quad \text{Equation 3}$$

In the present context, the term "trial" refers to a single random bus inversion decision made by a RBI device. A trial is considered successful when the random decision results in flipping up to half of the bits between the output data unit and the previous output data unit.

Let "FR" denote the bus frequency. FR indicates the number of data units traversing a link per time unit. The number of trials made by a single RBI device within a time window denoted "TW" is given by FR·TW. Further let "NR" denote the number of RBI devices incorporated across the fabric. The overall number of trials within the time window TW is given by:

$$n = FR \cdot TW \cdot NR \quad \text{Equation 4:}$$

In some embodiments, the processor evaluates the probability of failure using the cumulative Binomial distribution function of Equation 3. For example, Given a target toggle rate (denoted TTR), a failure occurs when the number of successful trials (k) does not exceed (1−TTR) of the overall number of trials (n). The probability of failure is given by:

$$PF=Pr(X\leq(1-TTR)\cdot n)=F(n,(1-TTR)\cdot n,p=0.5) \quad \text{Equation 5:}$$

For example, for a TTR of 60%, PF is given by:

$$PF=Pr(X\leq(0.4\cdot n)=F(n,0.4\cdot n,p=0.5) \quad \text{Equation 6:}$$

In some embodiments, a desired PF value is given, and the processor solves Equation 5 to determine a value of 'n' satisfying the desired PF. The processor then determines the number of RBI devices using Equation 4. In practice, the number of RBI devices can be set sufficiently large so that the probability of failure becomes negligible. In general, the number of RBI devices increases with decreasing the target toggle rate (limited to 50%). The inventors have found that with a target toggle rate of 60%, a failure rate of one failure event in several years is achievable in practical SoCs.

In some embodiments, the SoC network has multiple locations in the fabric, which are available for performing bus inversion, and the processor assigns the number of RBI devices (as calculated above) to at least some of the available locations. In general, the processor may assign an RBI device to an input and/or output of a network device in the SoC network, as described above. It is noted that when one or more of the available locations remain without RBI devices, the target toggle rate may be adjusted accordingly.

When protecting only part of the fabric with RBI devices, the saving in power consumption is typically smaller compared to the saving in protecting the entire fabric. For example, with a target toggle rate of 60%, power saving with full protection is 40%, but with protection of 80% of the fabric, the power saving reduces to 32% (40% of 80%).

In some embodiments, the number of required RBI devices for achieving the target toggle rate with the desired PF is larger than the number of locations available in the SoC for incorporating RBI devices. In such embodiments, the number of available locations may be increased by splitting at least some of the links in the SoC into two or more sectors, each of which comprising a partial subset of the lines of the link. The sectors of the same link are assigned respective RBI devices that make inversion decisions independently from one another (and from other RBI devices in the SoC).

Example SoC Configurations Incorporating Random Bus Inversion Devices

The random bus inversion embodiments described above may be extended to buses and fabrics of arbitrary, complexity. Example SoCs and fabrics of moderate/high complexity be described with reference to FIGS. 7 and 8 below. Various aspects of the SoCs in FIGS. 7 and 8 (excluding RBI devices 350 and bus receivers 354) are described in U.S. Patent Application "Multiple Independent On-chip Interconnect," filed Jun. 3, 2021 as U.S. application Ser. No. 17/337,805, whose disclosure is incorporated herein by reference. To the extent that any inconsistencies arise between this document and any document incorporated herein by reference, it is intended that this document control.

Figure 7:
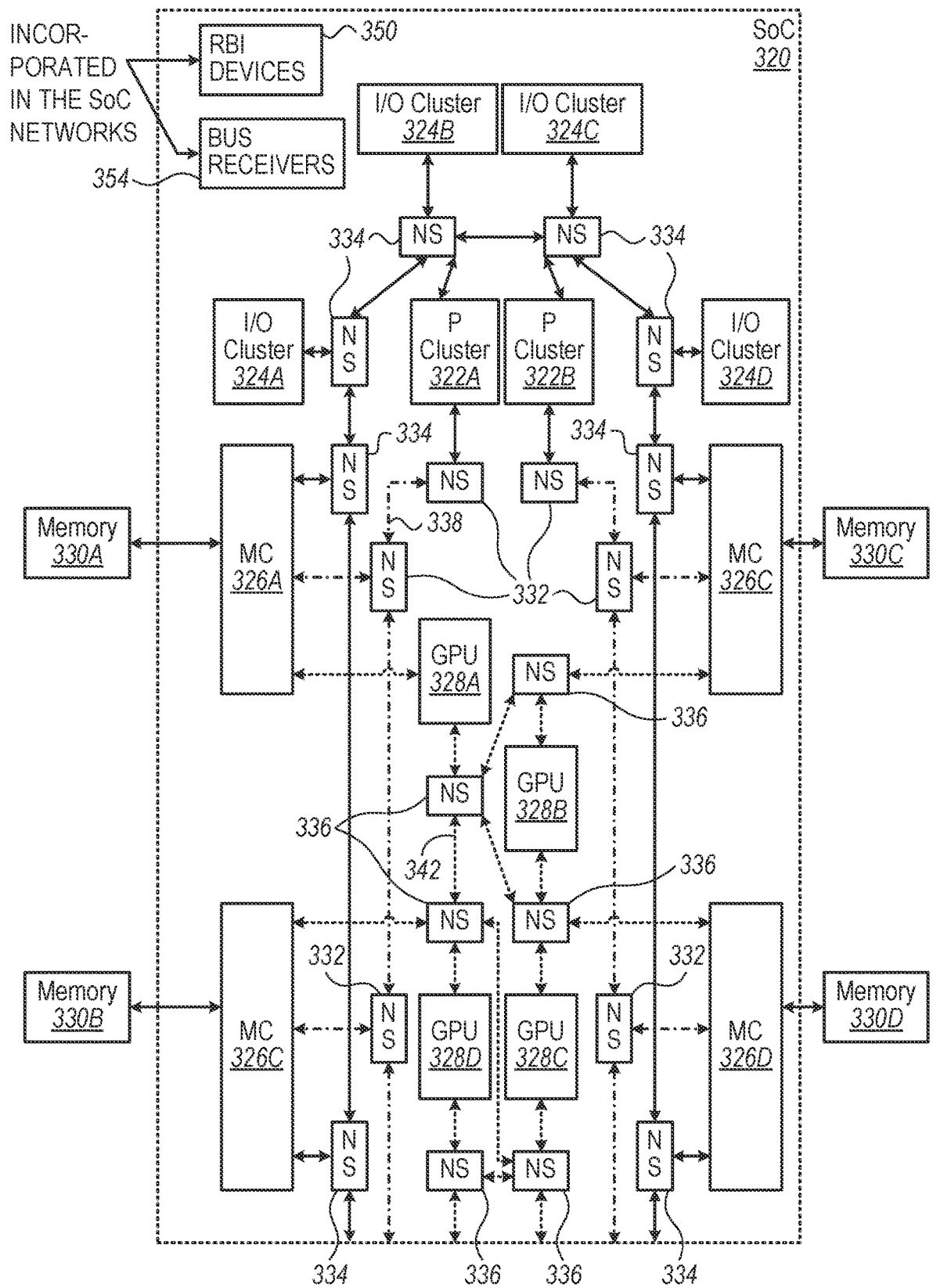
FIG. 7 is a block diagram that schematically illustrates a SoC comprising multiple internal networks supporting random bus inversion, in accordance with an embodiment that is described herein.

FIG. 7 is block diagram that schematically illustrates a SoC 320 comprising multiple internal networks supporting random bus inversion, in accordance with an embodiment that is described herein.

In the present example, SoC 320 comprises a CPU network, an IO network and a relaxed order network. The CPU network provides communication between CPU clusters such as 322A and 322B, and MCs such as 326A . . . 326D. The CPU network comprises interconnected NSs 332 to which the CPU clusters and the MCs are coupled. In some embodiments, the CPU clusters and/or MCs are coupled to NSs of the CPU network via suitable NIs, which are omitted from the figure for the sake of clarity.

The IO network provides communication between IO clusters such as 324A . . . 324D, and the CPU clusters, and clusters, CPU clusters and MCs are coupled. In some embodiments, the CPU clusters, IO clusters and MCs are coupled to the NSs of the IO network via suitable NIs, which are omitted from the figure for the sake of clarity.

The relaxed order network provides communication between GPUs such as 329A . . . 328D, and the MCs. The relaxed order network comprises interconnected NSs 336 to which the GPUs and the MCs are coupled. In some embodiments, the CPUs and MCs are coupled to the NSs of the relaxed order network via suitable NIs, which are omitted from the figure for the sake of clarity.

In some embodiments, power consumption in SoC 320 is controlled based on the random bus inversion techniques described above. In such embodiments, SoC 320 comprises RBI devices 350 and bus receivers 354, RBI devices 350 may be implemented, for example, using RBI device 100 of FIG. 2A or RBI device 150 of FIG. 2B, Bus receivers 354 may be implemented, for example, using bus receiver 180 of FIG. 3.

RBI devices 350 and bus receivers 354 are incorporated in selected locations within one or more of the CPU network, IO network and/or relaxed order network. For example, RBI devices 350 may be incorporated at output ports of NSs and NIs, and at input ports of NIs, as described above. Bus receivers 354 may be incorporated at edge locations of the various SoC networks, as described above.

Figure 8:
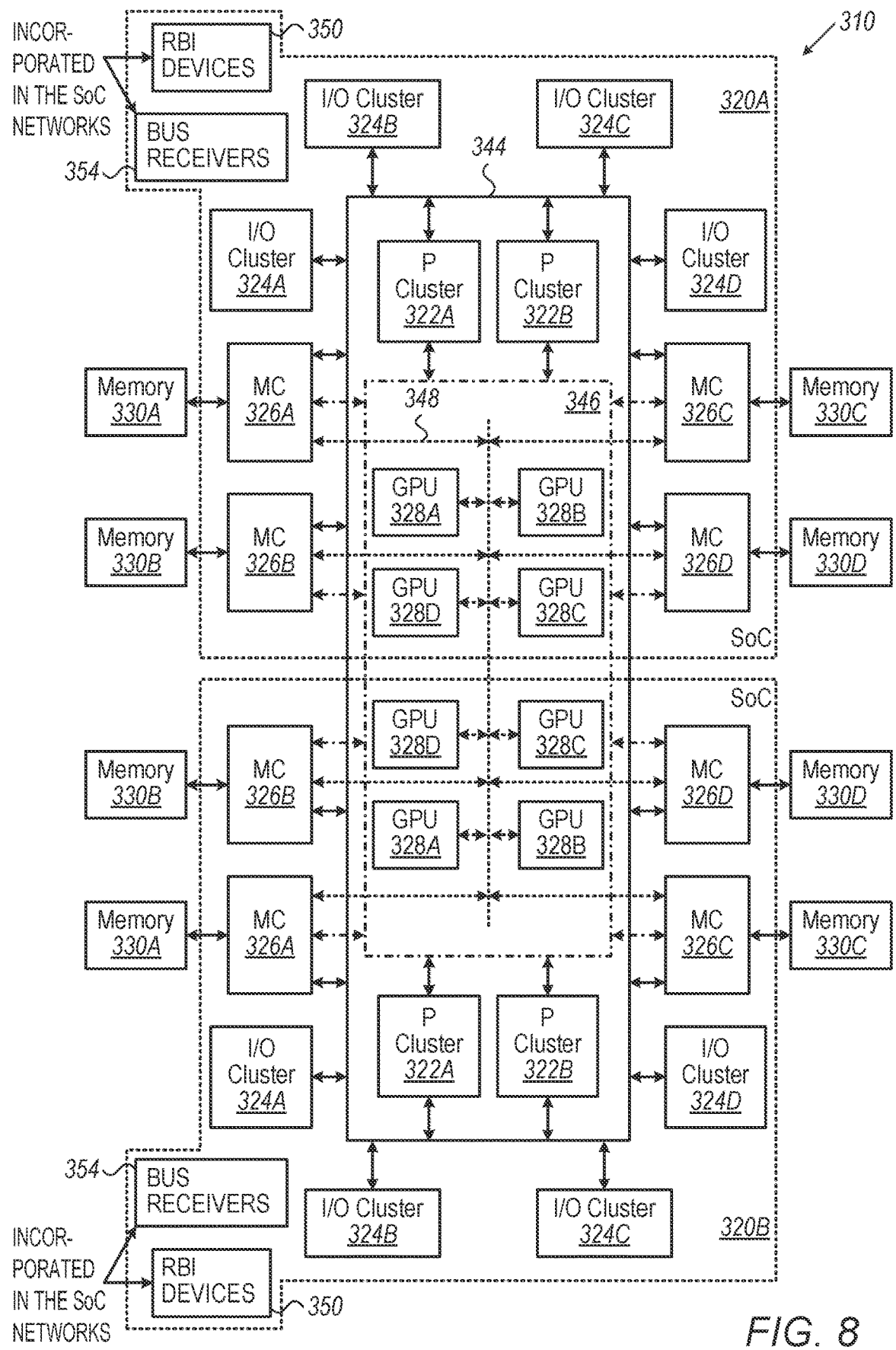
FIG. 8 is a block diagram that schematically illustrates multi-die system supporting random bus inversion, in accordance with an embodiment that is described herein.

FIG. 8 is a block diagram that schematically illustrates a multi-die system 310 supporting random bus inversion, in accordance with an embodiment that described herein.

In the present example, multi-die system 310 comprises SoCs 320A and 320B, implemented on two separate semiconductor dies. Each of SoCs 320A and 320B may comprise, for example, an instance of SoC 320 of FIG. 7. Multi-die system 310 comprises a CPU network 346, an IO network 344 and a relaxed order network 348. The NSs and NIs of these networks are omitted for the sake of clarity. In multi-die system 310, each of the SoC networks extends across the two SoC dies, forming networks that are logically the same even though they extend over the two dies.

In some embodiments, power consumption in multi-die system 310 is controlled based on random bus inversion techniques. In such embodiments, multi-die system 310 comprises RBI devices 350 and bus receivers 354 incorporated in selected locations of the SoC networks in SoCs 320A and 320B, as described above.

The configurations of SoCs 20, 80 and 320, multi-die system 310, RBI devices 100 and 150, and bus receiver 180, are example configurations, which are chosen purely for the sake of conceptual clarity. In alternative embodiments, other suitable SoC, multi-die system, RBI device, and bus receiver configurations can also be used. Elements that are not necessary for understanding the principles of the present invention, such as various interfaces, addressing circuits, timing and sequencing circuits and debugging circuits, have been omitted from the figures for clarity.

Some elements of SoCs 20, 80 and 320, and of multi-die system 310 such as CPU clusters 24, and 322A . . . 322B, IO clusters 84 and 324A . . . 324D, and some elements of RBI devices 100 and 150 such as decision makers 114 and 154, may be implemented in hardware, e.g., in one or more Application-Specific Integrated Circuits (ASICs) or FPGAs. Additionally or alternatively, CPU clusters 24 and 322A . . . 322B, and CPUs 328A . . . 328D can be implemented using software, or using a combination of hardware and software elements.

In some embodiments, some of the functions CPU clusters 24 and 322A . . . 322B, and CPUs 328A . . . 328D, may be carried out by general-purpose processors, which are programmed in software to carry out the functions described herein. The software may be downloaded to the relevant processor in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An electronic device, comprising:
a plurality of ports, including an input port and an output port, configured to communicate data units with one or more other devices across a fabric of a System on a Chip (SoC), the data units comprising N data bits, N being an integer larger than 1; and
circuitry configured to:
receive an input data unit via the input port;
make a random decision of whether to invert the N data bits in the input data unit, wherein the random decision is made independently of values of the data bits in the received input data unit;
produce an output data unit, by retaining or inverting the N data bits of the input data unit based on the random decision; and
send the output data unit via the output port.

2. The electronic device according to claim 1, wherein the circuitry is configured to receive the input data unit after the input data unit has been processed in a network device comprised in the fabric, and to transmit the output data unit via the output port to a link of the fabric.

3. The electronic device according to claim 1, wherein the circuitry is configured to receive the input data unit from a link of the fabric via the input port, and to send the output data unit for processing in a network device comprised in the fabric, via the output port.

4. The electronic device according to claim 1, wherein the circuitry is configured to receive via the input port a subsequent input data unit, and to make another decision of whether to invert the subsequent input data unit, randomly or based on the input data unit.

5. The electronic device according to claim 1, wherein the circuitry is configured to receive via the input port one or more other input data units that together with the input data unit jointly traverse the fabric, and to make respective decisions of whether to invert the other input data units depending on values of the output data unit and the other input data units.

6. The electronic device according to claim 1, wherein the circuitry is configured to make a first random decision of whether to invert a first subset of the N data bits of the input data unit, and to make a second random decision of whether to invert a second subset of the N data bits of the input data unit, wherein making the second random decision is independent of making the first random decision, and to produce the output data unit by retaining or inverting the first subset of the N data bits based on the first random decision, and retaining or inverting the second subset of the N data bits based on the second random decision.

7. The electronic device according to claim 6, wherein the circuitry is configured to produce respective first and second indications of whether the first subset of the N data bits and the second subset of the N data bits have been inverted, and to output the first and second indications via the output port or via another interface of the electronic device.

8. The electronic device according to claim 1, wherein the electronic device resides in a first location in the fabric, and a second electronic device that makes random decisions of whether to invert data units resides in a second different location in the fabric, and wherein the circuitry is configured to make the random decision independently of random decisions made by the second electronic device.

9. A method for bus inversion, comprising:
in an electronic device comprising a plurality of ports, including an input port and an output port, communicating data units with one or more other devices across a fabric of a System on a Chip (SoC), the data units comprising N data bits, N being an integer larger than 1,
receiving an input data unit via the input port;
making a random decision of whether to invert the N data bits in the input data unit, wherein the random decision is made independently of values of the data bits in the received input data unit;
producing an output data unit, by retaining or inverting the N data bits of the input data unit based on the random decision; and
sending the output data unit via the output port.

10. The method according to claim 9, wherein receiving the input data unit comprises receiving the input data unit after the input data unit has been processed in a network device comprised in the fabric, and wherein sending the output data unit comprises transmitting the output data unit via the output port to a link of the fabric.

11. The method according to claim 9, wherein receiving the input data unit comprises receiving the input data unit from a link of the fabric via the input port, and wherein sending the output data unit comprises sending the output data unit for processing in a network device comprised in the fabric, via the output port.

12. The method according to claim 9, and comprising receiving via the input port a subsequent input data unit, and making another decision of whether to invert the subsequent input data unit, randomly or based on the input data unit.

13. The method according to claim 9, and comprising receiving via the input port one or more other input data units that together with the input data unit jointly traverse the fabric, and making respective decisions of whether to invert the other input data units depending on values of the output data unit and the other input data units.

14. The method according to claim 9, and comprising making a first random decision of whether to invert a first subset of the N data bits of the input data unit, making a second random decision of whether to invert a second subset of the N data bits of the input data unit, wherein making the second random decision is independent of making the first random decision, and wherein producing the output data unit comprises retaining or inverting the first subset of the N data bits based on the first random decision, and retaining or inverting the second subset of the N data bits based on the second random decision.

15. The method according to claim 14, and comprising producing respective first and second indications of whether the first subset of the N data bits and the second subset of the N data bits have been inverted, and outputting the first and second indications via the output port or via another interface of the electronic device.

16. The method according to claim 9, wherein the electronic device resides in a first location in the fabric, and a second electronic device that makes random decisions of whether to invert data units resides in a second different location in the fabric, and wherein making the random decision comprises independently of random decisions made by the second electronic device.

17. An electronic system, comprising:
   a fabric comprising multiple network devices interconnected by links, each link comprising multiple lines for communicating data units comprising multiple data bits;
   a plurality of agent devices, coupled to communicate via the fabric;
   a plurality of bus inversion devices, incorporated at selected locations in the fabric, wherein each bus inversion device comprises:
   a plurality of ports, including an input port and an output port, configured to communicate the data units over the fabric; and
   circuitry configured to:
      receive an input data unit via the input port;
      make a random decision of whether to invert at least some of the data bits in the input data unit, wherein the random decision is made independently of values of the data bits in the received input data unit;
      produce an output data unit, by retaining or inverting the at least some of the data bits of the input data unit based on the random decision; and
      send the output data unit via the output port.

18. The electronic system according claim 17, wherein the fabric comprising multiple sub-fabrics for providing separate communication between respective subsets of the agent devices.

* * * * *